United States Patent
Chu et al.

(10) Patent No.: US 7,672,251 B2
(45) Date of Patent: Mar. 2, 2010

(54) MULTIPLE SERVICE METHOD AND DEVICE OVER HETEROGENEOUS NETWORKS

(75) Inventors: Po-Chia Chu, Kaohsiung (TW);
Tsung-Ying Yang, Kaohsiung (TW);
Yu-Hsien Chiu, Kaohsiung County (TW); Yuh-Ching Wang, Yunlin County (TW)

(73) Assignee: Industrial Technology Research Institute, Hsinchu (TW)

( * ) Notice: Subject to any disclaimer, the term of this patent is extended or adjusted under 35 U.S.C. 154(b) by 377 days.

(21) Appl. No.: 11/727,580

(22) Filed: Mar. 27, 2007

(65) Prior Publication Data

US 2008/0117832 A1    May 22, 2008

(30) Foreign Application Priority Data

Nov. 17, 2006    (TW) ............................... 95142512 A (51) Int. Cl.
*H04L 12/26*    (2006.01)
*H04L 12/56*    (2006.01)

(52) U.S. Cl. ................. 370/252; 370/389; 370/401
(58) Field of Classification Search ............... None
See application file for complete search history.

(56) References Cited

U.S. PATENT DOCUMENTS

| | | | |
|---|---|---|---|
| 6,789,118 B1 | 9/2004 | Rao | |
| 6,886,043 B1 | 4/2005 | Mauger et al. | |
| 6,980,515 B1 | 12/2005 | Schunk et al. | |
| 7,023,860 B1 | 4/2006 | Mauger et al. | |
| 7,046,669 B1 | 5/2006 | Mauger et al. | |
| 2003/0041238 A1* | 2/2003 | French et al. | 713/153 |
| 2004/0033779 A1* | 2/2004 | Ochi et al. | 455/11.1 |
| 2004/0210768 A1 | 10/2004 | Gariador et al. | |
| 2005/0070280 A1 | 3/2005 | Jung et al. | |
| 2005/0102384 A1* | 5/2005 | Ueno et al. | 709/223 |
| 2007/0121617 A1* | 5/2007 | Kanekar et al. | 370/389 |
| 2007/0136412 A1* | 6/2007 | Oba et al. | 709/200 |
| 2007/0153815 A1* | 7/2007 | She et al. | 370/401 |
| 2008/0130558 A1* | 6/2008 | Lee et al. | 370/329 |

FOREIGN PATENT DOCUMENTS

| | | |
|---|---|---|
| TW | 521512 B | 2/2003 |
| TW | 561745 B | 11/2003 |
| TW | I244868 B | 12/2005 |

* cited by examiner

*Primary Examiner*—Ricky Ngo
*Assistant Examiner*—Clemence Han
(74) *Attorney, Agent, or Firm*—Birch, Stewart, Kolasch & Birch, LLP (57) ABSTRACT

A multiple network service sharing method and a device for the same are provided. With the sub-network aggregation information collecting function and service arbitration function, the network user can easily add new network services to the existing network structure. The method and device support wired, wireless, IP-based and non-IP-based networks.

9 Claims, 8 Drawing Sheets

| Message | Function |
|---|---|
| Announce | Sub-network arbitration module sends Announce to inform the multiple service network dispatch module that a sub-network arbitration module is to be connected the shared network. |
| DiscoveryService | Sub-network arbitration module sends DiscoveryService to search the sub-networks to see if there is any service unit. |
| RegisterService | Sub-network service unit responds to the sub-network arbitration module with the service functions of the service unit. |
| AggreateService | Sub-network arbitration module sends AggregateService to all the sub-network arbitration modules on the shared network and waits for the aggregation information from the sub-networks. |
| InquireService | Sub-network service unit sends InquireService to inquire the sub-network arbitration module for the service unit to be found on the shared network. |
| ClaimTransaction | Sub-network service unit sends ClaimTransaction to request the sub-network arbitration module. |
| Open | Sub-network service unit sends Open to build up network sharing linking. |
| Close | Sub-network service unit sends Close to disconnect network sharing linking. |
| Request | Sub-network service unit requests service from the destination service unit. |
| Response | Sub-network service unit provides with service the service unit requesting service. |
| ACK | Respond with message, the message carries simple information. |

MULTIPLE SERVICE METHOD AND DEVICE OVER HETEROGENEOUS NETWORKS

BACKGROUND OF THE INVENTION

1. Field of the Invention

The present invention generally relates to a multiple network service sharing method and a device for the same and, more particularly, to a method and a device for multiple network service sharing over heterogeneous networks and protocols. With the method and device disclosed in the present invention, the network user can easily add new network services to the existing network structure. The method and device disclosed in the present invention support wired, wireless, IP-based and non-IP-based networks.

2. Description of the Prior Art

In recent years, the network system has been widely used in household and car-use environments. The number and variety of network connecting devices for household or car-use environments have grown rapidly. However, there are different techniques and standards for interconnecting these network connecting devices based on wireless networks and wired networks. Therefore, it is important to efficiently interconnect network connecting devices.

For IP-based networks, universal plug and play (UPnP) is popular for sharing resources over the networks. However, lots of devices based on non-IP-based networks such as USB (universal serial bus) mobile memories, IEEE 1394 digital cameras, CAN (controller area network) car-use information devices and LIN (local interconnect network) car-window control devices are not compatible with IP-based networks. Therefore, it is one of the motives of the present invention to share the resources of these devices and the resources of IP-based devices.

The currently used household networks include wired Ethernet, wireless IEEE802.11b/g, X-10 and controller networks, which are all IP-based and can communicate over the networks. For example, in a digital home, the lighting, the monitors, the audio system in the bedroom, the electric pot in the kitchen and the washing machine on the veranda can be controlled over IP-based networks.

However, most portable devices such as mp3 players, SONY PSP, digital cameras and digital video cameras use USB or IEEE-1394 protocols. Presently, the above-mentioned USB (mp3 players and digital cameras) and IEEE-1394 (SONY PSP and digital video cameras) networks operate independently without communicating each other. For car-use networks, CAN and LIN are used as applications of controller networks. Car-use multi-media networks use MOST (media oriented systems transport), FlexRay and IDB-1394 protocols. These protocols are not compatible and, thus the users have to make efforts to find solutions according to practical requirement.

Accordingly, the present invention discloses a method and a device for multiple network service sharing over heterogeneous networks and protocols. With the method and device disclosed in the present invention, the network user can easily add new network services to the existing network structure. The method and device disclosed in the present invention support wired, wireless, IP-based and non-IP-based networks.

A comparison between prior art Taiwan patents with the present invention is shown in Table 1. In Table 1, Taiwan Patent No. I244868 "Resource Sharing System for Household Electronic Products" uses a multiple network structure so as to provide multiple network service sharing; however, it is different from the disclosure of the present invention because it does not provide service arbitration and sub-network aggregation information collecting. Taiwan Patent No. 00561745 "Information Gateway and Method Thereof" is different from the disclosure of the present invention because it uses a single network structure and the information collected by sub-network aggregation information collecting does not include network state information. Taiwan Patent No. 00521512 "System for Using Sub-Network Router to Build Up Data Network" uses a multiple network structure; however, it is different from the disclosure of the present invention because the sub-network does not provide aggregation information collecting.

TABLE 1

Comparison between the prior art Taiwan patents with the present invention

| Patent/Pub. No. | Patent title | Network applicable to | Service arbitration | Sub-network aggregation information collecting |
| --- | --- | --- | --- | --- |
| The present invention | Multiple service Method And Device Over Heterogeneous Networks | Multiple networks with multiple nodes | Adding a sub-network arbitration module to an existing sub-network and automatically connecting to a plurality of service units so as to be connected to an external multiple service dispatch module. The communication between the sub-network arbitration module, the multiple service dispatch module and the service units follows a protocol so as to exchange sub-network aggregation information, arbitrate service request and perform trouble-shooting through a multiple service network exchange device for achieving service sharing among the sub-networks. | Collecting register information of the device on the sub-network (which includes register number of the device and corresponding capability information) and monitoring information of the network state (which includes clock jitter, packet round-trip time (RTT), packet loss rate, signal-to-noise ratio (SNR), signal strength, throughput, bandwidth utilization rate and service unit number). |

TABLE 1-continued

Comparison between the prior art Taiwan patents with the present invention

| Patent/Pub. No. | Patent title | Network applicable to | Service arbitration | Sub-network aggregation information collecting |
|---|---|---|---|---|
| 1244868 | Resource Sharing System for Household Electronic Products | Multiple networks with multiple nodes | Using an interface unit so as to convert the output signal from the electronic products connected over heterogeneous networks into a format fit in with universal connection interface and using a management unit so as to detect, monitor and record the electronic products in the system, hardware thereof and whether the electronic products are in usage so as to achieve hardware sharing. | N/A |
| 00561745 | Information Gateway and Method Thereof | Single network with multiple nodes | Single network with service sharing | Collecting register information of the device on the sub-network, which includes register number of the device and corresponding capability information. |
| 00521512 | System for Using Sub-Network Router to Build Up Data Network | Multiple networks with multiple nodes | Using a multiple network interface router and selecting a max band-width sub-network according to the band-width of the sub-networks so as to route the data to devices connected to the router. | N/A |

A comparison between conventional UPnP with the present invention is shown in Table 2. UPnP is based on IP-based, HTTP (hypertext transfer protocol) and SOAP (simple object access protocol) protocols and uses XML (extensible markup language) protocol for service information and data exchange. However, the disclosure of the present invention provides service sharing that is not limited in any protocols and supports IP-based and non-IP-based protocols. Moreover, the disclosure of the present invention provides dynamic network information collecting so as to collect information such as clock jitter, packet round-trip time (RTT), packet loss rate, signal-to-noise ratio (SNR), signal strength, throughput, bandwidth utilization rate and service unit number. The disclosure of the present invention further provides capabilities in network state sharing and service arbitration, which is not provided by UPnP.

TABLE 2

Comparison between conventional UPnP with the present invention

| The present invention | UPnP |
|---|---|
| Not limited in any protocols | Limited in the currently used IP, HTTP, XML and SOAP |
| Capability in static/dynamic network information collecting | N/A |
| Capability in network state sharing | N/A |
| Capability in service arbitration | N/A |

U.S. Pat. Nos. 7,046,669, 7,023,860, 6,980,515, 6,886,043, and 6,789,118 provide multiple service with an optimal service exchange path determined by an efficient transmission path or an algorithm according to the service type. However, the present invention is different from these prior art references.

SUMMARY OF THE INVENTION

It is a primary object of the present invention to provide a method for multiple network service sharing. The method uses a sub-network aggregation information collecting module and a multiple network service dispatch module so that the network user can easily add new network services to the existing network structure. The method disclosed in the present invention support wired, wireless, IP-based and non-IP-based networks.

It is another object of the present invention to provide a device for multiple network service sharing. The device comprises a sub-network arbitration module so as to dynamically monitor and collect the network state of the associated sub-network, periodically detect new/disconnected service units and collect aggregation information of other sub-networks so that the aggregation information enables the sub-network arbitration module to arbitrate and improve linking quality while there are multiple service requests or the traffic is heavy.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE PREFERRED EMBODIMENT

The present invention can be exemplified by the preferred embodiment as described hereinafter.

The present invention discloses a method and a device for multiple network service sharing over heterogeneous networks and protocols. The method and device use a sub-network aggregation information collecting module and a multiple service network dispatch module. Sub-network arbitration modules can be added to the existing network structure. Service units over multiple sub-networks can be shared by performing initialization processing, asynchronous processing, synchronous processing and service processing. More particularly, the multiple service network sharing device can be a hardware device or a software process. The hardware device can be an adaptor, while the software process can be based on Layer3/Layer4 and OSGi protocols.

Figure 1:
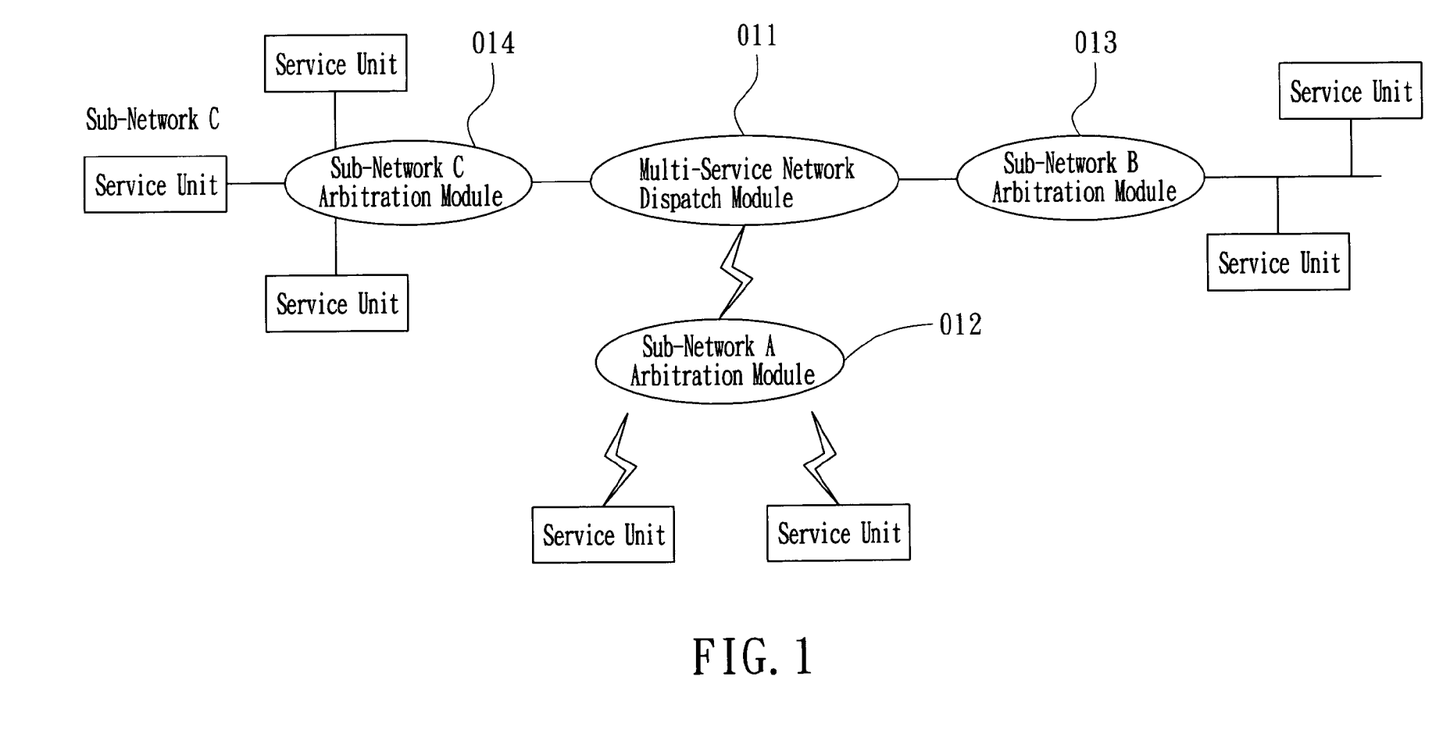
FIG. 1 is a schematic diagram showing a multiple service network sharing mechanism according to the present invention.

Please refer to FIG. 1, which is a schematic diagram showing a multiple service network sharing mechanism according to the present invention. In FIG. 1, a sub-network arbitration module is added to each of the existing sub-networks (A, B and C), namely, the sub-networks A arbitration module 012, the sub-networks B arbitration module 013 or the sub-networks C arbitration module 014. Each of the sub-network arbitration modules is connected to a plurality of service units and is connected to one another via a multiple service network dispatch module 011. Each sub-network arbitration module, the multiple service network dispatch module 011 and the service units communicate according to a protocol and therefore, service sharing over sub-networks can be achieved via the multiple service network dispatch module 011.

The sub-network arbitration modules and the multiple service network dispatch module are connected so as to support wired, wireless, IP-based and non-IP-based networks. In one embodiment, the multiple service network dispatch module is connected to an IEEE 802.11a/b/g wireless local-area network (WLAN) and a USB network. A multi-media player unit on the IEEE 802.11a/b/g WLAN receives a MPEG-4 stream data from a USB storage unit on the USB network so as to play the music. In another embodiment, the multiple service network dispatch module is connected to an Ethernet network, an X-10 network and an IDB 1394 network. The Ethernet network is IP-based, while the X-10 network the IDB 1394 network are non-IP-base.

A plurality of service units and a sub-network arbitration module (the sub-networks A arbitration module 012, the sub-networks B arbitration module 013 or the sub-networks C arbitration module 014) is connected on each sub-network (A, B and C). The service units can be the customer service unit, the manufacturer service unit and the hybrid service unit. The customer service unit receives a service function to be processed, the manufacturer service unit provides the service function and the hybrid service unit combines the capabilities of the customer service unit and the manufacturer service unit. For example, the customer service unit on a USB sub-network is a USB speaker for receiving audio data to be played; the manufacturer service unit is a USB web camera providing real-time images on a display; and the hybrid service unit is a portable USB storage device for storing data to be accessed. The sub-network arbitration module is a core unit on the sub-network for dynamically monitoring and collecting network states of the associated sub-network, periodically detecting new/disconnected service units and collecting aggregation information of other sub-networks so that the aggregation information enables the sub-network arbitration module to arbitrate and improve linking quality while there are multiple service requests or the traffic is heavy.

The aggregation information comprises service unit register information, service exchange state information and network state information. The service unit register information records information of service unit number and corresponding service functions. The service exchange state information records the service exchange states including the service exchange number, source and destination addresses of services. The network state information records the associated sub-network state including the service unit number, network characteristics and band-width utilization rate. In the present invention, the aggregation information collecting mechanism of the sub-network collects, manages and updates the aggregation information.

Figure 2:
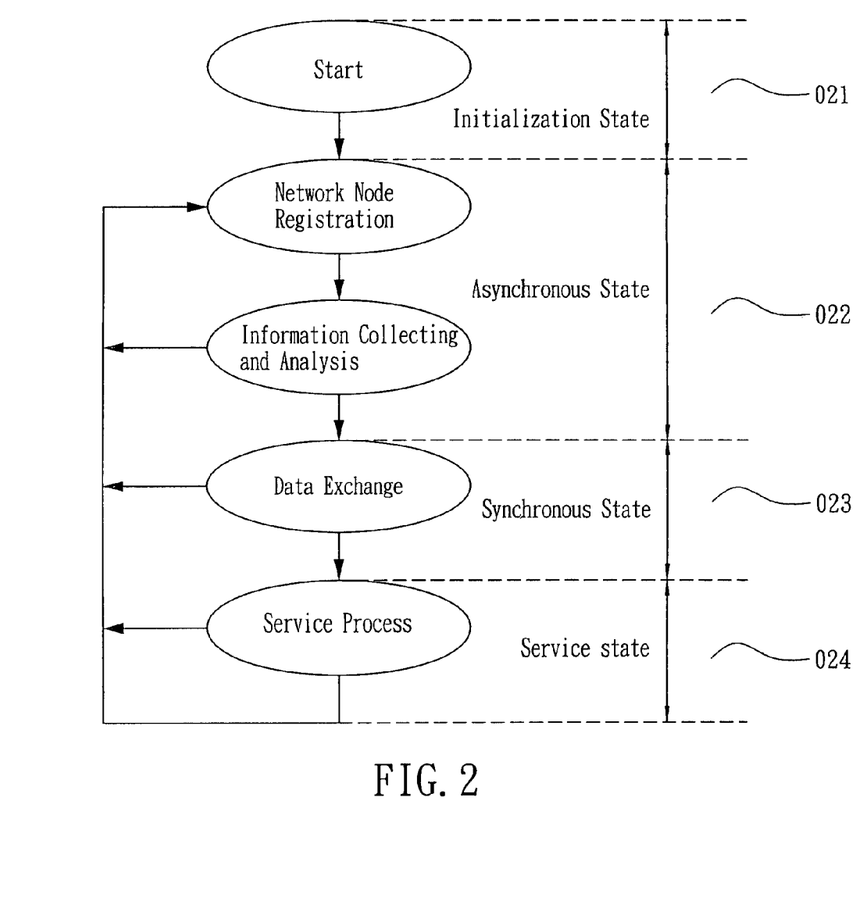
FIG. 2 is a schematic diagram showing multiple service network sharing states according to the present invention.

Please refer to FIG. 2, which is a schematic diagram showing multiple service network sharing states according to the present invention. In FIG. 2, four states are provided so as to achieve multiple service network sharing. Each state may occur at any time.

At the initialization state 021, the hardware and software of a network node is initialized. The network node can be an arbitrator, a service unit or a multiple service network dispatch module in the present invention.

The asynchronous state 022 comprises network node registration and information collecting and analysis. Newly added network nodes need to be registered so that the network node manager is informed of the number of network nodes and service resources. Static and dynamic network state information are collected and analyzed so as to be informed of associated network characteristics and real-time network states. In the present invention, newly added sub-network arbitration modules need to be registered in the multiple service network dispatch module, and newly added service units need to be registered in the sub-network arbitration module. After the registration processing, the sub-network arbitration module collects and analyzes the static and dynamic network state information of the service units over the associated network.

At the synchronous state 023, the network managers of the multiple networks exchange the data carried by a message header comprising arbitration message, synchronous message and service message. The arbitration message records the static and dynamic network state information, the synchronous message records the synchronous information so as to make sure the critical services are performed within an appointed time period and the service message records the service information comprising service message types, source and destination addresses of services, service types of the service units and service commands. In the present invention, the sub-network arbitration module transmits the aggregation information to other sub-network arbitrators so as to achieve aggregation information exchange.

At the service state 024, the static and dynamic network states are known to the network managers after data exchange between the network managers. When subscriber's service request messages are received, the network manager arbitrates each of the service request messages according to the static and dynamic network states and starts trouble-shooting so as to prevent service error and loss.

Figure 3:
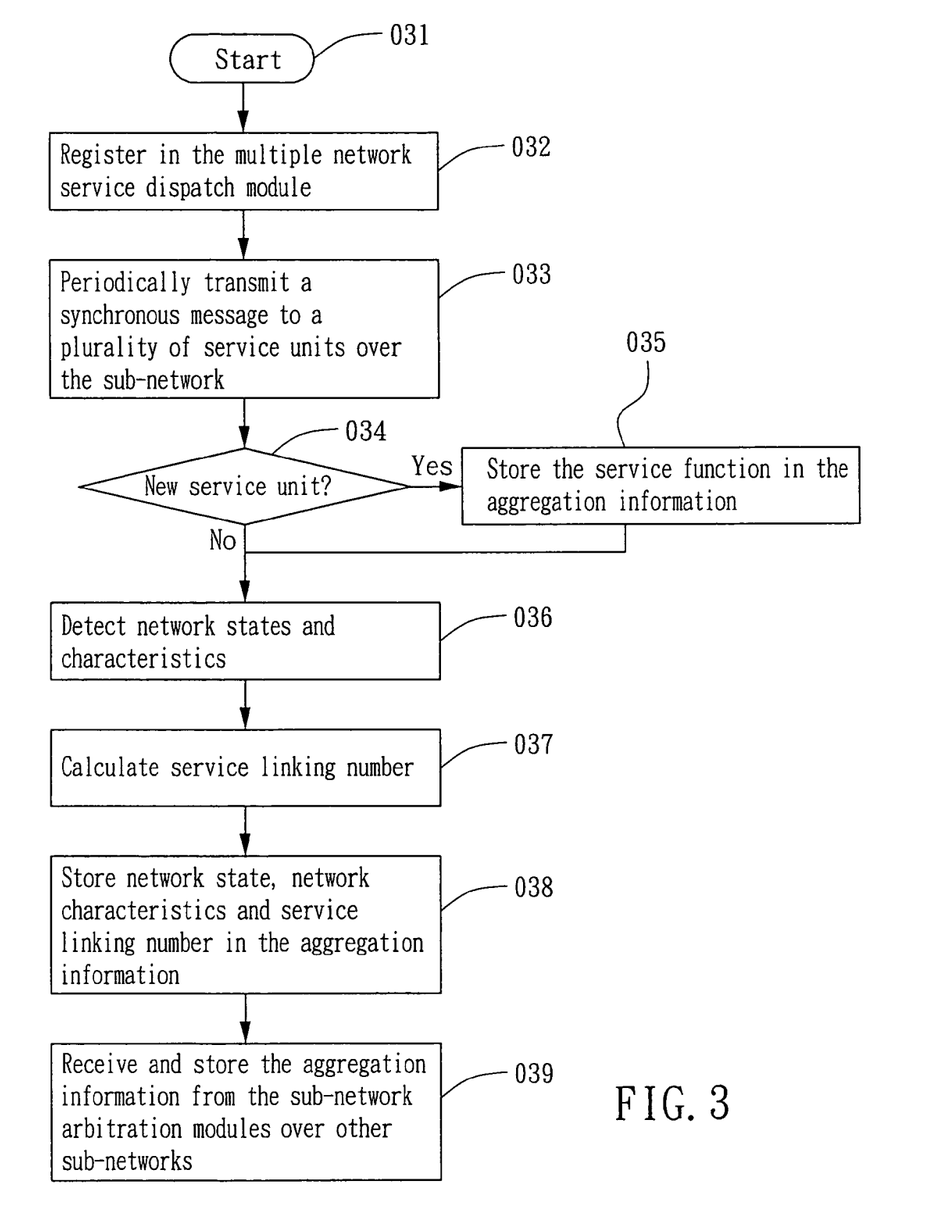
FIG. 3 is a flow-chart showing sub-network aggregation information collecting according to the present invention.

Please refer to FIG. 3, which is a flow-chart showing sub-network aggregation information collecting according to the present invention. In FIG. 3, the procedure starts with Step 031. In Step 032, a newly added sub-network arbitration module is asked to or actively registered in the multiple network service dispatch module. In Step 033, after registration, the sub-network arbitration module periodically transmits a synchronous message to a plurality of service units over the associated network. In Step 034, it is detected whether there is a new service unit added to the network. If there is a new service unit added to the network, the service unit reports its service function to the sub-network arbitration module and the sub-network arbitration module deploys a service unit number to the newly added service unit and stores the service unit number and corresponding service function in the service unit register information of the aggregation information, as described in Step 035. After registration, the sub-network arbitration module monitors the associated static and dynamic network states and stores the monitored information in the network state information of the aggregation information, as described in Step 036 to Step 038. The sub-network arbitration module periodically broadcasts the aggregation information through the multiple service network dispatch module to sub-network arbitration modules over other sub-networks; and meanwhile, the sub-network arbitration module receives the aggregation information transmitted from the sub-network arbitration modules over other sub-networks, as described in Step 039. Accordingly, each sub-network arbitration module is informed of the network states and characteristics of all the sub-networks. The sub-network arbitration module arbitrates each of service request messages according to the above-mentioned information so as to improve the linking service quality.

The dynamic state information of the aggregation information is for real-time network states and comprises clock jitter, packet round-trip time (RTT), packet loss rate, signal-to-noise ratio (SNR), signal strength, throughput, band-width utilization rate and exchange service unit number.

The static state information of the aggregation information is for network characteristics and comprises maximum service unit number, available resource dispatch of the service units, maximum data rate, media access mode of the service units, user-defined critical services.

In one embodiment, the sub-network arbitration module uses a ping program to test the packet round-trip time (RTT) on an IP-based network. Longer packet round-trip time (RTT) indicates that the network is busier.

In one embodiment, the sub-network arbitration module uses SNMP (simple network management protocol) so as to obtain MIB (management information base) information of the service units on an IP-based sub-network.

In one embodiment, the sub-network arbitration module on a CAN controller network uses software so as to dynamically calculate the time interval between two CAN packets received, periodically calculate the standard deviation of clock jitter and periodically calculate the packet loss rate so as to estimate the available band-width of the CAN network.

In one embodiment, a wireless device on an IEEE 802.11a/b/g WLAN is interfered with a RF signal to cause effective band-width reduction. The sub-network arbitration module on the IEEE 802.11a/b/g WLAN uses hardware or software to collect SNR variation while being linked to each of the service units so as to estimate the effective band-width of the IEEE 802.11a/b/g WLAN.

Figure 4:
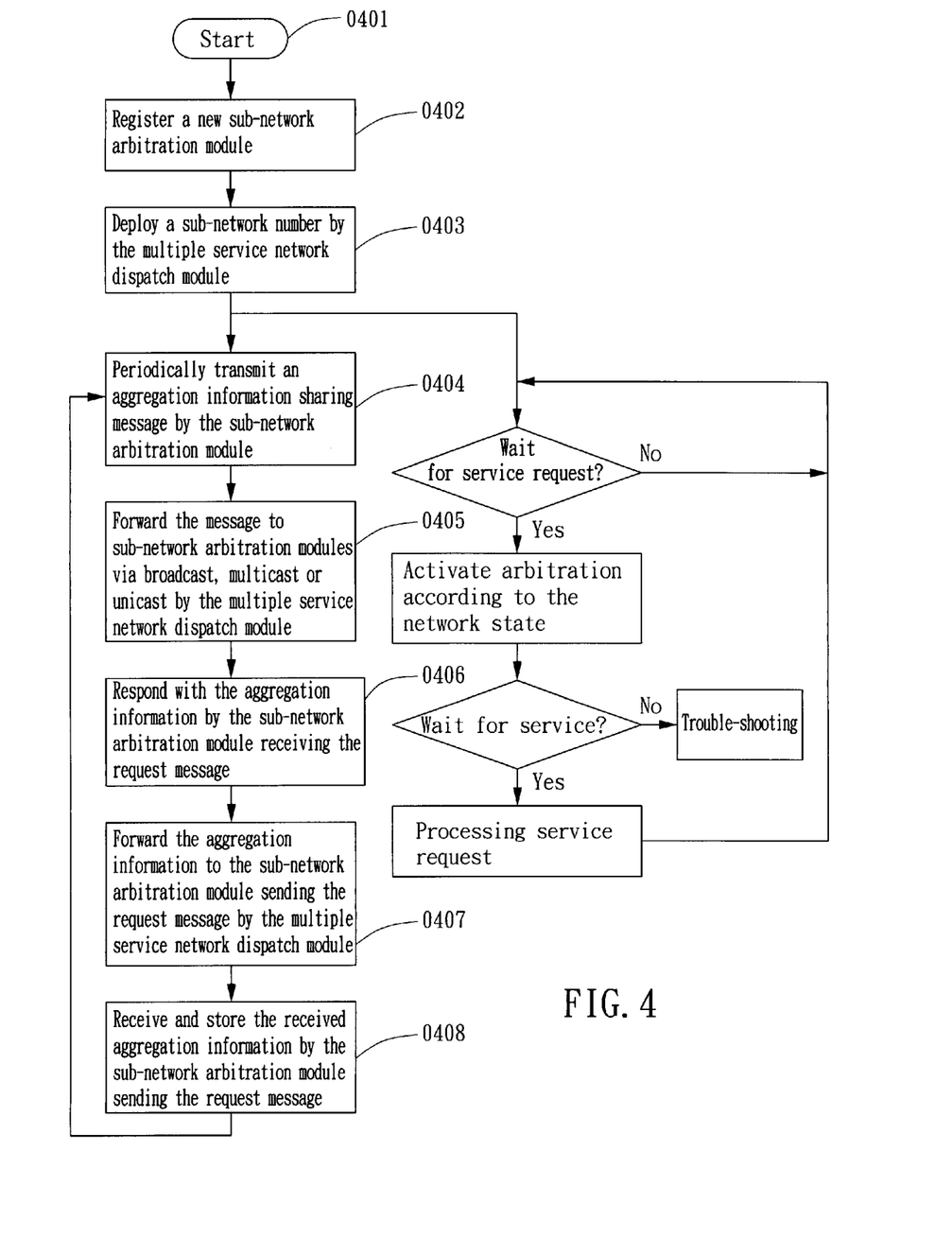
FIG. 4 is a flow-chart showing multiple service network exchange according to the present invention.

Please refer to FIG. 4, which is a flow-chart showing multiple service network exchange according to the present invention. After the initialization state, the procedure starts with Step 0401 to operate at an asynchronous state. In Step 0402, a new sub-network arbitration modules are registered. When a new sub-network arbitration module is added to the shared network, a register message is sent to inform the multiple service network dispatch module. After receiving the register message, the multiple service network dispatch module deploys a sub-network number to the newly added sub-network arbitration module, as described in Step 0403. The multiple service network dispatch module dispatches a message to a sub-network based on the sub-network number.

When the procedure is at the synchronous state, the sub-networks exchange the aggregation information and the sub-network arbitration module periodically transmits an aggregation information sharing message to the multiple service network dispatch module, as described in Step 0404. After receiving the aggregation information sharing message, the multiple service network dispatch module forwards the message to sub-network arbitration modules connected to the multiple service network dispatch module according to the register information. The forwarded message is transmitted via broadcast, multicast or unicast, as described in Step 0405. After receiving the information exchange request message, the sub-network arbitration module transmits the aggregation information of the sub-network through the multiple service network dispatch module to the sub-network arbitration module sending the request message according to the request message, as described in Step 0406 to Step 0407. The sub-network arbitration module sending the request message receives and stores the received aggregation information, as described in Step 0408.

Figure 5:
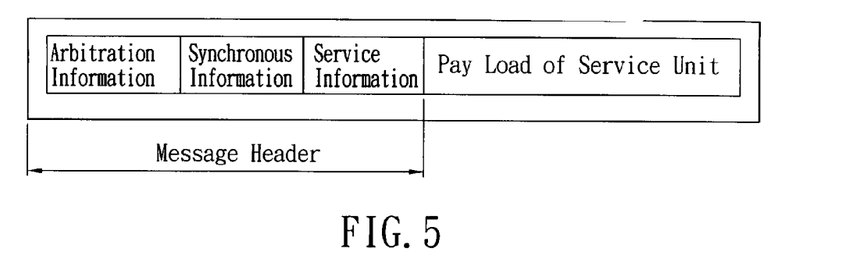
FIG. 5 is a schematic diagram showing a service message exchange format according to the present invention.
Figure 6:
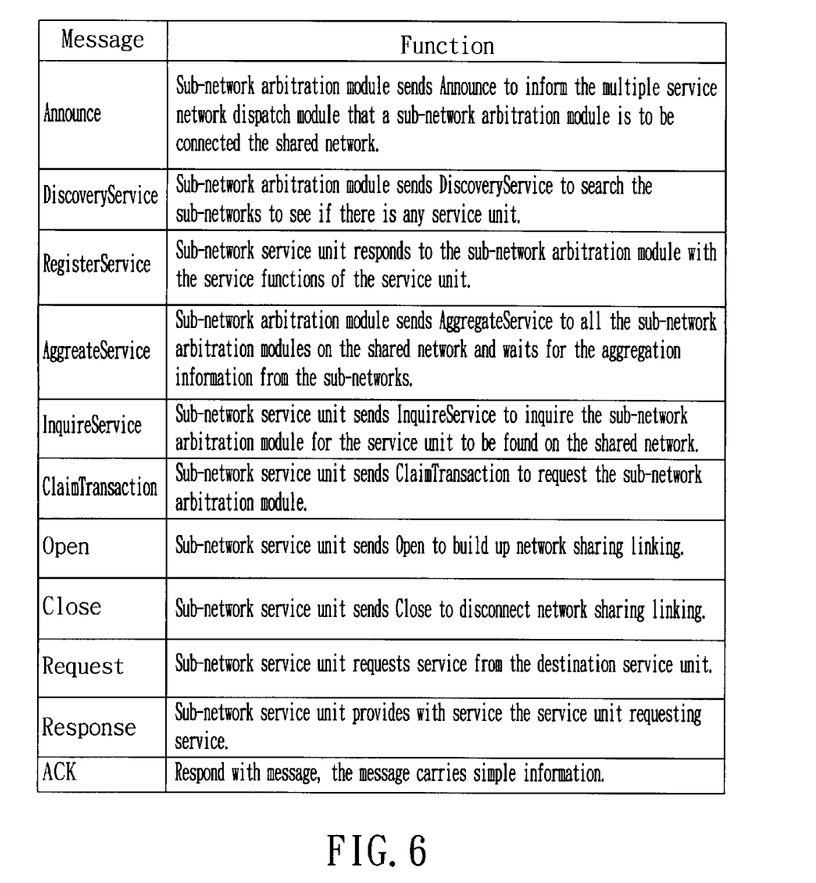
FIG. 6 is a table showing messages and functions of a sub-network according to the present invention.

When the procedure is at the synchronous state and the service state, each of the sub-networks exchanges the service message. FIG. 5 is a schematic diagram showing a service message exchange format according to the present invention. The message header comprises at least arbitration message, synchronous message and service message. The arbitration message records the static and dynamic network state information, the synchronous message records the synchronous information so as to make sure the critical services are performed within an appointed time period and the service message records the service information comprising service message types (as shown in FIG. 6), source and destination addresses of services, service types (such as audio, video, storage and display) of the service units and service commands (such as play, pause and stop). The message header is followed by the payload, storing service content data (such as mp3 audio data, MPEG2 video data and CAN tire pressure data).

When the procedure is at the service state, the sub-network arbitration modules process service requests. The sub-network arbitration modules wait for service request messages from the multiple service network dispatch module or the associated sub-networks. When service request messages are received, the sub-network arbitration modules arbitrate each of the service request messages according to the aggregation information of the sub-networks at the local end and the destination end. Arbitration is determined by the static and dynamic network state information on the shared network.

When a service request is under lack of shared network resources or poor network reliability, the sub-network arbitration module associated with the service unit can turn down the service request, respond with a negative message and delete the service request instead of transmitting the service request to the multiple service network dispatch module. The sub-network arbitration module can also register the service request message within a tolerated time period before transmitting the service request message. If the resource is sufficient to process the service request, the service request message is then transmitted to the multiple service network dispatch module that forwards the service request message to a service unit at the destination end.

In one embodiment, the multiple service network sharing method of the present invention is exemplified. In the embodiment, the method uses a multiple network service dispatch module, a plurality of sub-network arbitration modules and a plurality of service units on each of sub-networks. Each sub-network arbitration module, the multiple service network dispatch module and the service units communicate according to a protocol. As shown in FIG. 6, the protocol includes a plurality of messages and functions. Alternatively, the protocol may include other messages and functions.

Figure 7:
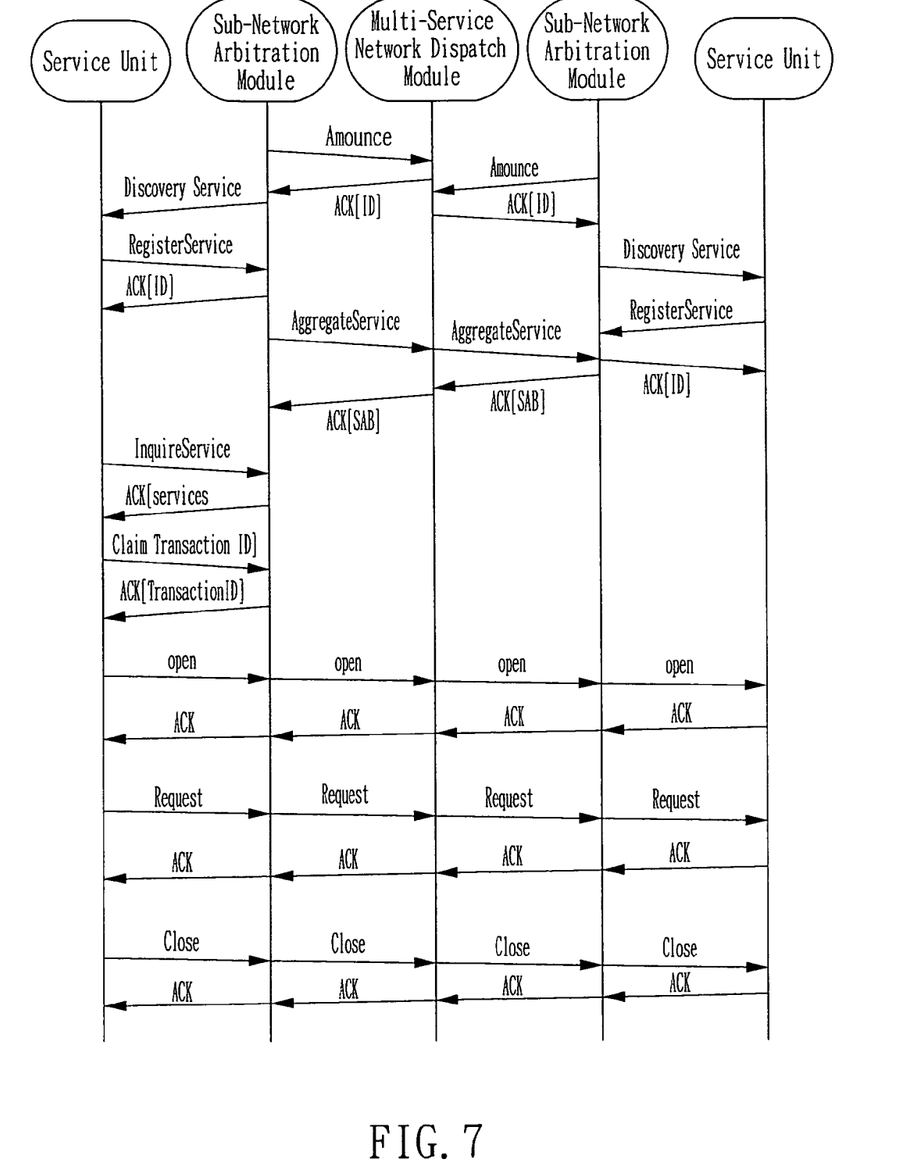
FIG. 7 is a schematic diagram showing service sharing and message exchange over heterogeneous sub-networks according to the present invention.

Please refer to FIG. 7, which is a schematic diagram showing service sharing and message exchange over heterogeneous sub-networks according to the present invention. To begin with, the multiple service network dispatch module is initialized so as to wait for Announce message from different sub-network arbitration modules. The multiple service network dispatch module deploys a never-used sub-network number using ACK message including a deployed sub-network number to the sub-network arbitration modules. The number is for the multiple service network dispatch module to decide which sub-network arbitration module on which sub-network the message on the shared network is dispatched to. After the number is dispatched to one of the sub-network arbitration module, multiple service network exchange as well as sub-network aggregation information collecting can be achieved.

Figure 8:
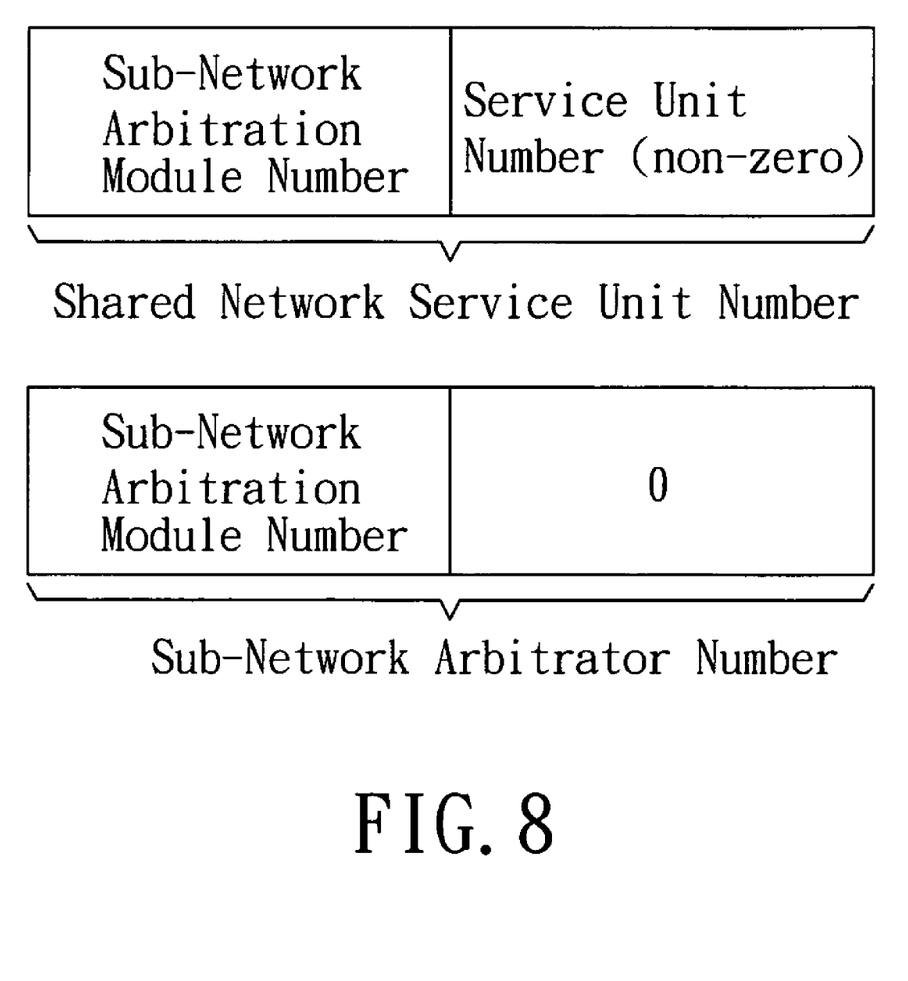
FIG. 8 is a schematic diagram showing identification of shared networks according to the present invention.

The sub-network arbitration module periodically sends DiscoveryService message to the associated sub-network to inquire if there is any service unit. The service unit on the sub-network responds to the sub-network arbitration module with RegisterService message after receiving the DiscoveryService message, recording information the service content of the service unit. The sub-network arbitration module issues a service unit number and responds with ACK message including a service unit number to the service unit. FIG. 8 is a schematic diagram showing identification of shared networks according to the present invention. A service unit number is added to the sub-network number. The sub-network arbitration module is labeled using a sub-network number and a specific number.

Meanwhile, the sub-network arbitration module periodically sends AggregateService message to the multiple service network dispatch module. The multiple service network dispatch module forwards the AggregateService message to all the sub-network arbitration modules on the shared network according to practical requirement and requests information from the sub-networks. The sub-network arbitration modules respond with ACK message including requested information to the multiple service network dispatch module after receiving the request message. The multiple service network dispatch module forwards the ACK message including requested information to the sub-network arbitration module that sends AggregateService message so that the sub-network arbitration module stores the requested information. The requested information includes information of the associated sub-network detected and monitored by the sub-network arbitration module. The information includes service unit information, packet loss rate, signal strength, bandwidth utilization rate and service exchange information.

The sub-network service units send InquireService to inquire the sub-network arbitration module for the service unit to be found on the shared network. According to the inquired result, the sub-network service units send ClaimTransaction to the associated sub-network arbitration modules to deploy a transaction ID to the service units requesting service. The service units issues Open message to build up network sharing linking. The routing path of the Open message is along the associated sub-network arbitration module, the multiple service network dispatch module, destination sub-network arbitration module and the destination service unit. After the destination service unit receives the Open message, a confirmation signal is returned to the service units requesting service along the same path.

After the network sharing linking is built up, the service units issue Request message and request the message to be forwarded to the destination service unit according to the Open message. The destination service unit forwarded the requested information to the service units requesting service according to the Request message. Finally, when the exchange is completed, the destination service unit or the requesting service unit sends Close to disconnect network sharing linking.

Figure 9:
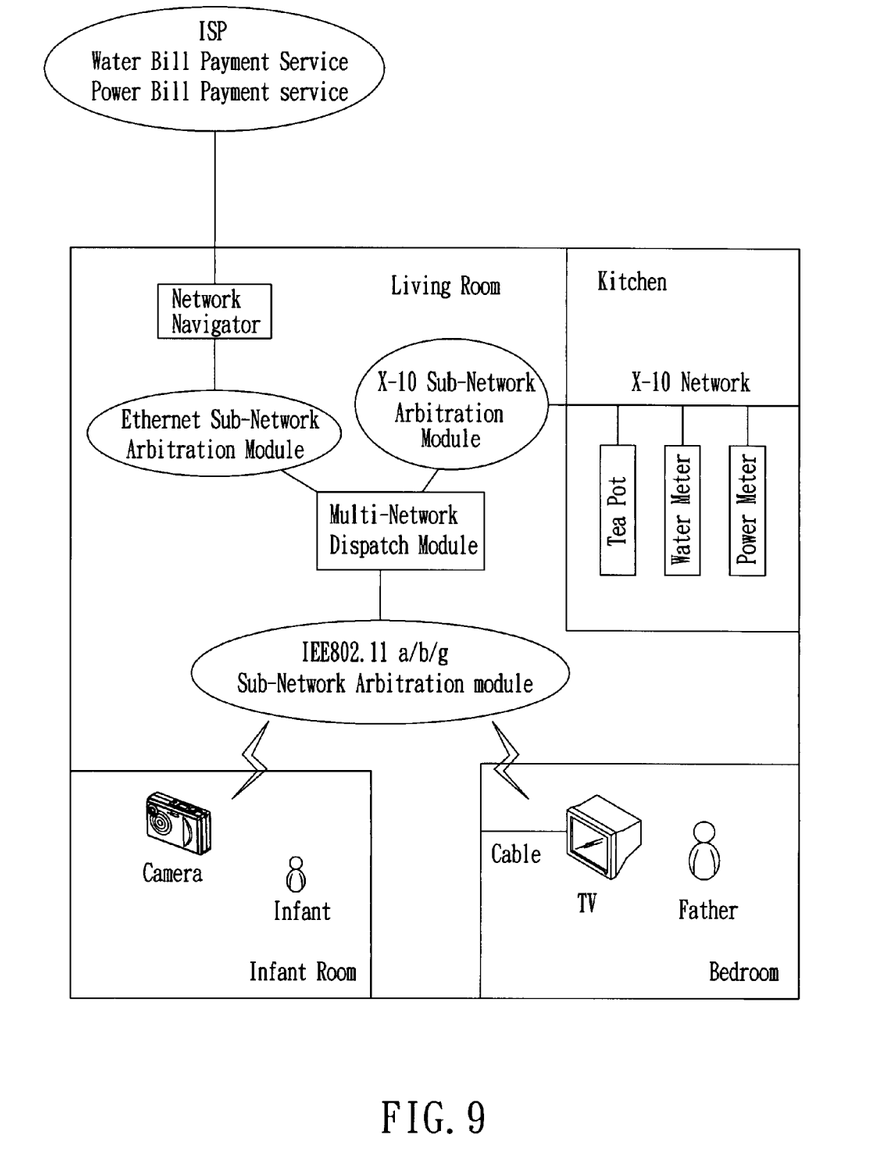
FIG. 9 is a schematic diagram showing an exemplifying case of the present invention.

Please further refer to FIG. 9, which is a schematic diagram showing an exemplifying case of the present invention. Assume three heterogeneous networks (for example, X-10, IEEE 802.11a/b/g and Ethernet networks) respectively connected to a multiple service network dispatch module are installed in a house so as to support portable wireless cameras, displays with wireless interfaces, a water meter, a power meter and a network navigator. These devices are not compatible without sub-network arbitration modules. With the use of the sub-network arbitration modules, these devices can communicate over heterogeneous networks so as to achieve service sharing and exchange.

With the use of the method and device disclosed in the present invention, the father can watch the television in the bedroom while monitoring the baby in the infant room through a display with picture-in-picture (PIP) function. The display can even display the power bill and the water bill so that he can pay over the network. In the present embodiment, a wireless camera is used to monitor the baby. Information of the power meter and the water meter is provided on the X-10 network so as to calculate the power fee and the water fee. The above-mentioned information is collected by sub-network arbitration modules and dispatched by the multiple service network dispatch module to an IEEE 802.11a/b/g arbitrator. The sub-network arbitration module on the IEEE 802.11a/b/g sub-network forwards the information to the display. When the father receives information of the water bill and the power bill, he pays on the display, which transmits the service information to the Ethernet sub-network arbitration module. The Ethernet sub-network arbitration module forwards the service information through a network navigator to an ISP service.

According to the above discussion, it is apparent that the present invention discloses a method and a device for multiple network service sharing over heterogeneous networks and protocols. With the method and device disclosed in the present invention, the network user can easily add new network services to the existing network structure. The method and device disclosed in the present invention support wired, wireless, IP-based and non-IP-based networks. Therefore, the present invention is novel, useful and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A method for multiple network service sharing, comprising:
    using at least two sub-network arbitration modules connected to a multiple network service dispatch module, wherein each of the sub-network arbitration modules is connected to a plurality of respective service units so that the service units share resources over sub-networks via the multiple network service dispatch module;
    collecting aggregation information of the sub-networks at an asynchronous state;
    exchanging the aggregation information of the sub-networks at a synchronous state; and
    exchanging, arbitrating and trouble-shooting multiple service packets at a service state,
    wherein the aggregation information exchanging at the synchronous state comprises arbitration information, synchronous information and service information that are carried on a message header comprising arbitration message, synchronous message and service message,
    wherein the arbitration message records static and dynamic network state information, the synchronous message records the synchronous information so as to make sure critical services are performed within an appointed time period and the service message records the service information comprising service message types, source and destination addresses of services, service types of the service units and service commands.

2. The method for multiple network service sharing as recited in claim 1, wherein the sub-networks can be IP-based networks or Non-IP-based networks.

3. The method for multiple network service sharing as recited in claim 1, wherein the protocol of the sub-networks is one of Ethernet, 802.11a/b/g, GPRS (General Packet Radio Service), CAN (Controller Area Network), LIN (Local Interconnect Network), FlexRay, RS485, IEEE1394, IDB1394, USB (Universal Serial Bus), MOST (Media Oriented Systems Transport), Bluetooth, zigbee and X-10.

4. The method for multiple network service sharing as recited in claim 1, wherein the aggregation information of the sub-networks comprises static state information and dynamic state information.

5. The method for multiple network service sharing as recited in claim 4, wherein the static state information comprises maximum service unit number, available resource dispatch of the service units, maximum data rate, media access mode of the service units, and user-defined critical services.

6. The method for multiple network service sharing as recited in claim 4, wherein the dynamic state information comprises clock jitter, packet round-trip time (RTT), packet loss rate, signal-to-noise ratio (SNR), signal strength, throughput, bandwidth utilization rate and exchange service unit number.

7. The method for multiple network service sharing as recited in claim 4, wherein the step of collecting the static state information and the dynamic state information is performed according to SNMP (Simple Network Management Protocol) and ICMP (Internet Control Message Protocol) protocols over IP-based networks.

8. The method for multiple network service sharing as recited in claim 1, wherein the service state is for exchanging, arbitrating and trouble-shooting the multiple service packets arbitrated according to static state information and dynamic state information of the aggregation information and troubleshot by turning down a service request message and corresponding with a negative message or registering the service request message within a tolerated time period before transmitting the service request message.

9. The method for multiple network service sharing as recited in claim 8, wherein the negative message is determined by defining a type and code of ICMP (Internet Control Message Protocol) packets over IP-based networks or determined by defining an identifier and data of CAN (Controller Area Network) and LIN (Local Interconnect Network) packets over non-IP-based networks or determined by defining a payload of FlexRay and Zigbee packets over FlexRay and Zigbee networks or determined by defining a sorting of bits of a transmission message format of RS-485 packets over RS-485 networks.

* * * * *